March 4, 1924.
E. McDONOUGH
COMPOSITE GEAR
Filed April 12, 1919
1,485,464
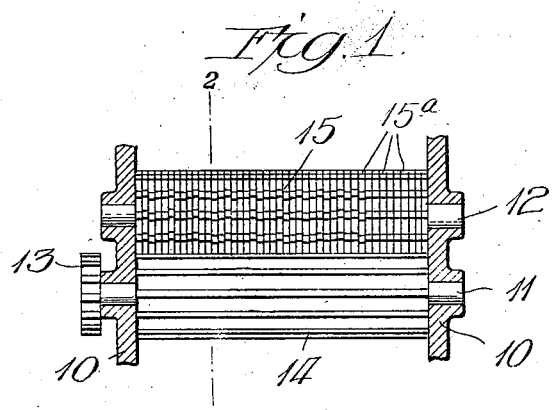
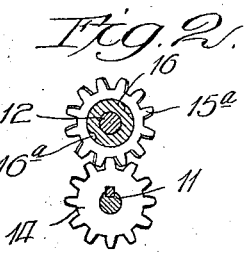
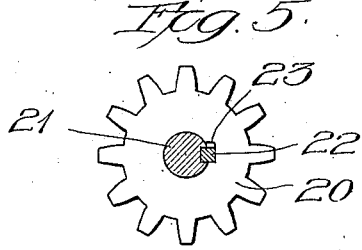
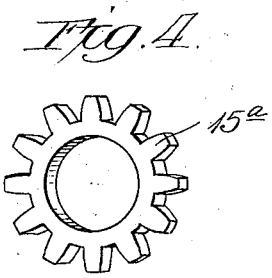
Witness:
Harry S. Gaither
Inventor
Edward McDonough
by Sheridan, Jones, Sheridan & Smith
Attys Patented Mar. 4, 1924.

1,485,464

UNITED STATES PATENT OFFICE.

EDWARD McDONOUGH, OF ELGIN, ILLINOIS, ASSIGNOR, BY MESNE ASSIGNMENTS, TO STEWART-WARNER SPEEDOMETER CORPORATION, OF CHICAGO, ILLINOIS, A CORPORATION OF VIRGINIA.

COMPOSITE GEAR.

Application filed April 12, 1919. Serial No. 289,656.

*To all whom it may concern:*

Be it known that I, EDWARD McDONOUGH, a citizen of the United States, residing at Elgin, in the county of Kane and State of Illinois, have invented certain new and useful Improvements in Composite Gears, of which the following is a specification.

The purpose of this invention is to provide a gear which is substantially noiseless in its operation. It is well known that gears as ordinarily constructed are very noisy due to the clashing of the moving teeth as the gears mesh with each other, and this disadvantage is not substantially overcome by lubricating the engaging parts of the gears. The excessive noise produced by the meshing of gears seems to be due largely to the fact that the gear teeth cannot be perfectly formed individually and in their relation to each other, so that when two gears intermesh the teeth do not coact smoothly and uniformly from one end of the gears to the other, a condition which causes increased trouble and noise when the gears are of considerable length parallel to their axes of rotation. It has been found that the noise of meshing gears may be eliminated and the wear thereof substantially reduced by adopting a construction which permits the teeth of one gear to adapt themselves to the irregularities in the teeth of the other gear with which it is intermeshed. I have therefore provided an elastic or composite gear which is made up of a plurality of complementary gears mounted side by side. The teeth of the complementary gears are in substantial alinement, but the complementary parts are capable of relative angular movement, so that as the composite gear meshes with another gear, the complementary gears may move with respect to each other to adapt themselves to the irregularities of the teeth of the rigid meshing gear, so that the composite teeth of the elastic gear maintain a uniform and smooth contact with the teeth of the other gear with which they engage.

Other features and objects of the invention will appear from the following specification, taken with the accompanying drawings, in which certain embodiments are illustrated.

In the drawings—

Figure 1 shows a side elevation of two meshing gears, one of these gears embodying the principles of the present invention;

Fig. 2 shows a sectional view on the line 2—2 of Fig. 1;

Fig. 3 shows a side elevation of the shaft and bushings upon which the complementary gear members are mounted;

Fig. 4 shows a perspective view of one of the complementary gear members illustrated in Figs. 1 and 2; and Fig. 5 shows a cross-sectional view through a driving shaft, illustrating the adaptation of the invention to a driving gear.

In the drawings, a pair of bearing members 10 are spaced apart and provided with alining bearings in which are mounted the shafts 11 and 12. The shaft 11 is rotatably mounted, but the shaft 12 is preferably fixed by a key or by being provided with a non-circular extremity. The projecting end of the shaft 11 has fixed thereon a gear or other element 13 through which power may be applied to this shaft to rotate the same. The shaft 11 acts as a driving shaft and has keyed thereon between the members 10 a driving gear 14 which is formed in one piece by the usual method of gear cutting. A composite gear 15 is carried by the shaft 12 and meshes with the driving gear 14. In the embodiment illustrated in Fig. 1, the composite gear 15 is an idler gear made up of a plurality of complementary gears 15$^a$ which are relatively thin, as illustrated in Figs. 1 and 4, being formed preferably by stamping them from a sheet of steel, aluminum, or other desired material. These complementary gears 15$^a$ are arranged side by side with their lateral faces in contact to form what may be called a laminated or composite gear. These complementary gear elements are mounted to rotate freely on the cylindrical bushings 16 formed of Babbitt metal, or the like, which in turn are mounted to rotate freely on the shaft 12. The outer surfaces of the bushings 16 are provided with small indentations 16$^a$ adapted to receive lubricating material in order to provide a permanent lubrication for the complementary gears rotating thereon. Several of the bushings 16 may be used depending upon the length of the shaft 12 and of the gear carried thereby.

Owing to the impossibility of forming a gear 14 with working surfaces extending uniformly in a straight line from one end of the gear to the other, it is impossible to secure a uniform smooth working contact between the surfaces of the meshing teeth when both gears are of the usual rigid or integral construction. This disadvantage is overcome by using the composite gear of the present invention in connection with the integral driving gear. As the driving gear rotates, the complementary gears 15ª are capable of moving relative to each other on the bushings 16 carried by the shaft 12, so that a projection on a tooth of the gear 14 at one point will cause a corresponding yielding of the particular complementary gear which engages that projection, thus securing a smooth contact between the teeth of the gear 14 and the teeth of the gear 15 throughout the length of the gears. The teeth of the complementary gears are maintained substantially in alinement by reason of their engagement with the teeth of the gear 14, but they are permitted to move relatively to each other to a sufficient degree to compensate for irregularities in the gear 14 and to overcome all noise produced by the meshing of the teeth. The composite gears are preferably made very thin, similar to the laminations of the pole pieces in an electric generator, thereby bringing about a more perfect adjustment of the composite gear to the irregularities of the rigid gear.

In Fig. 5, I have illustrated a modified form of the invention showing the adaptation of the composite construction to a driving gear. In this embodiment, the complementary gear elements 20 are mounted on a shaft 21 and are prevented from turning freely on the shaft by a key 22 which is securely seated in a keyway in the shaft, and which engages a keyway 23 in the gear. The keyway 23 is made wider than the key 22 in order to permit some relative movement of the complementary gears as the entire composite gear rotates in mesh with another gear.

The particular gears illustrated in Fig. 1 are designed for use in speedometer construction and operation, wherein it is particularly desirable to eliminate excessive noise caused by the meshing of the gears, but the invention is capable of application to other forms of gears used for various purposes, and whatever may be the real cause or causes of the noise ordinarily produced by the meshing of the gear teeth, it has been found that the present invention eliminates this noise and effects a smooth running of the gears without interfering with the efficiency of the gears as driving or power transmitting elements.

Although I have shown and described certain embodiments of the invention for purposes of illustration, it will be understood that it may be constructed in various different forms without departing from the scope of the appended claims.

It will be obvious that the means described and shown of preventing noise between the gears cannot be effectively employed when the laminated gear is in mesh with two other gears of usual rigid construction, because the accommodation of the laminated gear to one of the intermeshing rigid gears would tend to defeat accommodation to the other intermeshing gear.

What I claim is:

1. In combination, a shaft, a bushing mounted on said shaft, and a plurality of gear laminations arranged in contact side by side and rotatably mounted on said bushing, said bushing being provided with means for lubricating said laminations.

2. In combination, a cylindrical bearing member, a plurality of complementary gears rotatably mounted on said member with their lateral faces in contact and forming a composite gear, said bearing member being provided with means for lubricating said complementary gears.

3. In combination, a shaft, a plurality of bushings arranged end to end and rotatably mounted on said shaft, and a plurality of complementary gears arranged in contacting relation side by side and rotatably mounted on said bushings to form a composite gear.

In testimony whereof, I have subscribed my name.

EDWARD McDONOUGH.